United States Patent [19]
Adams

[11] Patent Number: 5,553,644
[45] Date of Patent: Sep. 10, 1996

[54] FENCE FOR WOODWORKING MACHINE

[76] Inventor: Phillip A. Adams, 11665 Elm Ridge Rd., San Antonio, Tex. 78230

[21] Appl. No.: 488,563

[22] Filed: Jun. 8, 1995

[51] Int. Cl.$^6$ ..................................................... B27B 31/00
[52] U.S. Cl. ........................... 144/253.2; 33/648; 33/811; 144/135.2; 144/253.1; 269/303
[58] Field of Search ..................... 409/218; 144/134 R, 144/134 A, 253 R, 253 J; 33/42, 640, 641, 645, 648, 811; 269/303

[56] References Cited

U.S. PATENT DOCUMENTS

| | | | |
|---|---|---|---|
| 4,793,604 | 12/1988 | Taylor | 269/303 |
| 5,016,693 | 5/1991 | Haffely et al. | 144/134 A |
| 5,018,562 | 5/1991 | Adams | 144/253 R |
| 5,195,730 | 3/1993 | Taylor . | |
| 5,215,296 | 6/1993 | Adams et al. | 269/303 X |

*Primary Examiner*—W. Donald Bray
*Attorney, Agent, or Firm*—Cox & Smith Incorporated

[57] ABSTRACT

A workpiece guiding fence for a woodworking machine having a rotating vertical axis cutting tool comprises a fence support of hollow rectangular configuration defining a chamber which is connectable to a vacuum source for removal of dust and chips. A three part fence structure comprises a forward fence portion, a rearward fence portion, and an insert portion are adjustably positionable on the fence support. The insert portion is fabricated from a cuttable material and is moved into full engagement with the rotating cutting tool to provide a recess conforming to the configuration of the cutting tool. When a workpiece is guided along the aforedescribed three part fence, dust and chips produced by the cutting operation are withdrawn into the fence support by the vacuum source. Subsequent operations utilizing the same cutting tool permit the insert, which has been cut to conform to the configuration of such cutting tool, to be mounted on the fence and to effect the rapid, yet highly accurate, alignment of the three part fence with the specific cutting tool.

15 Claims, 4 Drawing Sheets

FENCE FOR WOODWORKING MACHINE

FIELD OF THE INVENTION

This invention relates to an improved fence for woodworking machines of the type having a cutting tool having a vertical axis of rotation and projecting upwardly relative to the horizontal table of the woodworking machine.

BACKGROUND OF THE INVENTION

Woodworking machines having a horizontal table and a power driven cutting tool projecting upwardly through such table and rotating about a vertical axis, have long been used in the art for cutting grooves in, or finish on a workpiece. To accurately guide the workpiece along the side of the cutting and/or shaping tool, guide members, commonly called a fence, and defining an elongated vertical planar surface against which the workpiece is advanced into contact with the cutting tool, is a matter of some difficulty. This positioning problem is addressed and solved in my prior U.S. Pat. No. 5,215,296.

When the cutting operation has to be performed on a workpiece surface which is abutting the fence, or closely laterally spaced relative thereto, it has been the prior art practice to cut an opening or recess in the vertical planar guiding surface and also the horizontal planar bottom surface of the fence to prevent inadvertent contact of the cutting tool with such surfaces. Such opening creates several disadvantages. When the leading edge of the workpiece enters such opening, there is a distinct tendency of the cutting tool to draw such leading edge into the opening, resulting in a defect on the cut surface of the workpiece known as a snipe. More importantly, the opening represents a hazard to the machine operator. Furthermore, such large opening permits the ready discharge into the environment of dust and chips inherently produced by the cutting operation notwithstanding the fact that an air flow into the opening is created.

It follows that an improved fence construction that overcomes the aforesaid deficiencies of the prior art and eliminates the safety hazard, represents a desired improvement in the art of woodworking machines.

SUMMARY OF THE INVENTION

Accordingly, it is an object of this invention to provide an improved fence construction that overcomes the above stated disadvantages of prior art constructions.

The improved fence construction of this invention comprises a hollow, elongated tube of rectangular cross-section which may be conventionally mounted on the table of a woodworking machine and functions as a support for two identical cooperating fence elements. Said elongated tube defines a bottom planar surface for mounting on the table surface of the machine, and a vertical planar surface which is positioned to lie parallel to the desired linear movement of a workpiece relative to a rotating, vertical axis cutting tool which projects above the table surface.

The central portions of both the planar horizontal surface and the vertical planar surface are cut away to provide a clearance opening for said cutting tool which is substantially greater in height, length and width than the configuration of the cutting tool. The vertical planar surface of the fence support is thus divided into a forward workpiece entering portion and a rearward workpiece discharge portion relative to the cutting tool.

Two identical fence elements of a generally rectangular configuration are provided, the first of which is secured to the forward portion of the vertical planar surface of the fence support, and the second of which is secured to the rearward portion of the vertical planar surface of the fence support. The securing means permits separate longitudinal movement of the two fence elements relative to the vertical planar face of the workpiece support so that an opening can be provided between the opposed ends of the two fence elements of at least the same length as the first mentioned opening in the fence support. Suitable bolts are provided to secure the two fence elements in the aforesaid spaced apart position. Both fence elements have vertical planar outer surfaces along which a workpiece is guided.

A plate-like fence insert or barrier of readily cuttable material, such as wood or a rigid plastic, is then snugly but removably mounted in the opening between the two opposed ends of the two fence elements. The insert has an outer vertical planar surface which is co-planar with the workpiece guide surfaces of the forward and rearward fence elements. The cutting tool is then activated and the fence support is advanced laterally to pass the cutting tool through the fence insert, thus producing an opening in the insert having the exact contour of the cutting tool. Thus, the insert can function as a gauge to accurately position the two fence elements relative to the same cutting tool in subsequent operations. It is readily apparent that a similar gauging insert can be formed for each cutting tool to be used on the particular woodworking machine. Since there is no significant opening adjacent the cutting tool, operator safety is greatly improved.

Another feature of the three piece fence embodying this invention is the substantial reduction of dust and chips being discharged into the atmosphere by the cutting operation. As mentioned above, the fence support is of tubular configuration. Both ends of the tubular fence support may be supplied with suitable closures so as to provide an internal chamber which is in fluid communication with the slight clearance that may exist between the contoured opening in the fence insert opening and the tool contour.

A coupling for an air hose may then be applied to the body of the tubular fence support, preferably on one of the end closures, for connection to a vacuum source which will substantially prevent the discharge of dust or chips produced by the cutting operation to the atmosphere.

Another feature of a wood working fence embodying this invention is the provision of an inexpensive, yet highly accurate mechanism for making minute adjustments to the lateral positions of each fence element relative to the fence support. The inner face of each fence element is provided with a pair of elongated cylindrical holes extending the full length of the respective fence element and vertically spaced relative to each other. An end cap is press fitted or otherwise secured to one end of each fence element and defines cylindrical bores coaxially aligned with said cylindrical holes.

An elongated adjusting rod is then inserted through each of the end cap bores. Each said rod has a cylindrical bearing surface at its one end which supports the rod for rotation in the respective end cap bore. A plurality of elongated grooves are provided on the exterior of each rod and the radial depths of such grooves increase by slight increments around the periphery of each rod. A pair of vertically spaced ribs on said vertical planar surface of the fence support project through elongated slots provided in the inner face of the respective fence element to selectively engage an equal depth pair of selected grooves. Thus, rotation of the grooved rods effects a lateral adjustment of the respective fence element in increments on the order of 0.016 inches.

To inform the machine operator of the exact angular position of the grooved rods, a plastic strip bearing indicia equal in number to the number of grooves is wrapped around the cylindrical bearing surface of each grooved rod. Such indicia may be viewed through small slots respectively provided in the end cap in overlying relationship to each circle of indicia. To maintain the vertical planar surface of each fence element in a true vertical plane, the two grooved rods controlling the lateral spacing of the respective fence element are always adjusted to show the same indicia.

The rearward fence element may be transversely shifted relative to the forward fence element or vice versa by setting the two grooved rods in the rear fence element to different indicia settings than the two indicia settings of the grooved rods of the forward fence element.

This feature is particularly desirable when a shaping or jointing operation is to be performed on the workpiece, resulting in a thin layer of wood being removed from the workpiece surface abutting the forward fence element. The rear fence element can be transversely moved toward the cutting tool by rotating the grooved rods to accurately position its vertical planar face in the same plane as the new surface on the workpiece.

In the cutting of a workpiece, the precut opening in the insert closely surrounds the cutting tool and any dust or chips are drawn into the vacuumized interior of the fence support and deposited in a filter bag conventionally provided in a vacuum source, such as a tank type sweeper.

Further advantages of the invention will be readily apparent from the following detailed description, taken in conjunction with the annexed sheets of drawings on which is illustrated a preferred embodiment of the invention.

DESCRIPTION OF THE PREFERRED EMBODIMENT

Figure 2:
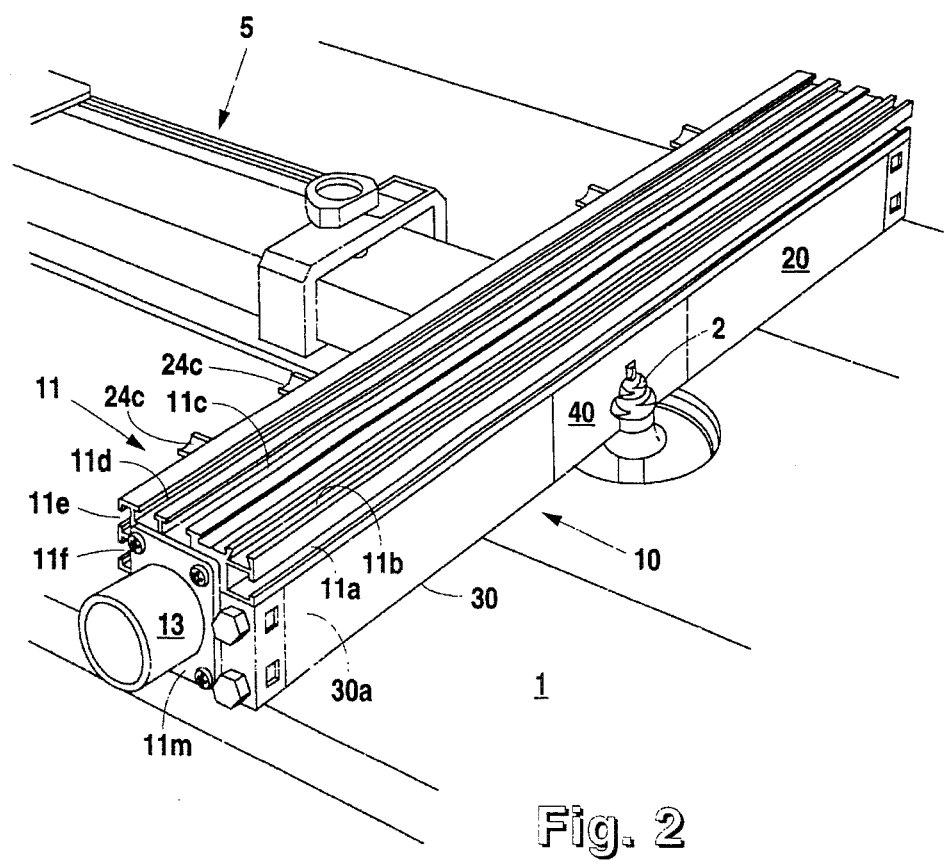
FIG. 2 is a perspective view of the fence of FIG. 1 positioned on the work table of a woodworking tool and having the fence insert cut by a cutting tool rotating above a vertical axis.

A fence 10 embodying this invention is mounted on the top of a work table 1 through which a vertical axis rotating cutting tool 2 projects. As best shown in FIG. 2, the fence 10 may be clamped in conventional fashion to the table 1 or it may be adjustably positioned relative to the cutting tool 2 by a micro-adjustable positioning mechanism 5 of the type shown in my U.S. Pat. No. 5,215,296 and sold by Jointech, Inc. of San Antonio, Tex. under the trademark IPM. The positioning mechanism 5 forms no part of the presently claimed invention.

Figure 3A:
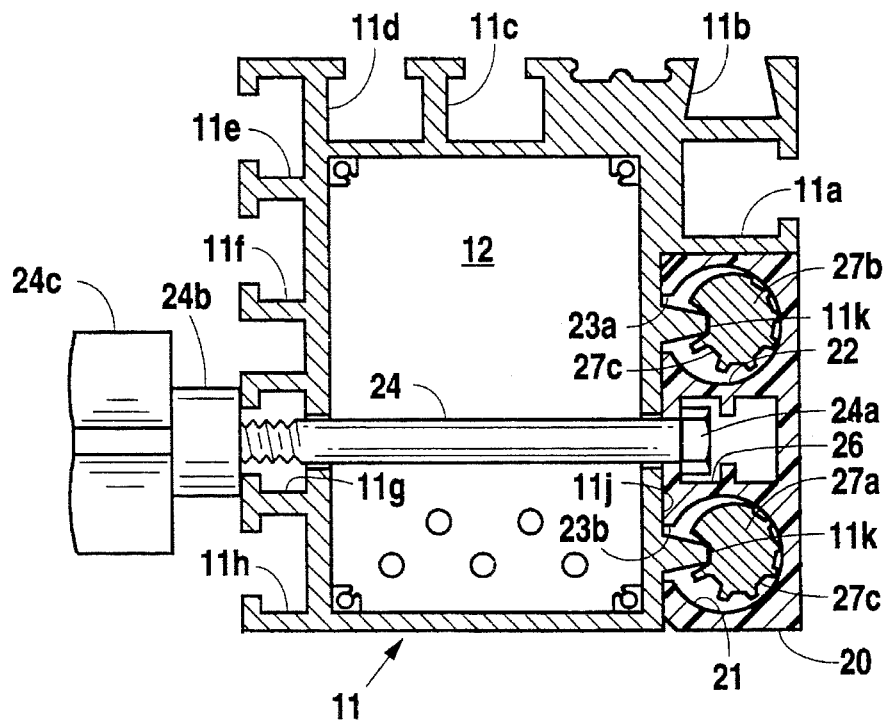
FIG. 3A is a sectional view taken on the plane 3—3 of FIG. 1, showing the fence element in one extreme lateral position.

As best shown in FIG. 3A, the fence 10 comprises an elongated tubular body 11 formed of metal or a rigid plastic which is of generally rectangular configuration and defines an elongated rectangular chamber 12. Each end of fence body 11 is suitably closed by an attached plate 11m and an air tube connection 13 is secured to one of the plates 11m of the tubular body 11. Air tube connection 13 is connected in conventional fashion to a hose (not shown) leading to a source of vacuum so as to produce a flow of air out of the elongated rectangular chamber 12.

The tubular body or fence support 11 is preferably provided with a plurality of parallel T-slots 11a, 11b, 11c, 11d, 11e, 11f, 11g and 11h, respectively, disposed on the top surface of the tubular body 11 and each side surface. These T-slots are employed for the mounting of accessory devices, such as height blocks for assisting the guiding of a tall workpiece past the cutting tool 2, or for connection to a positioning mechanism. These T-shaped mounting slots are provided solely as a manner of convenience and form no part of the presently claimed invention.

The tubular body 11 has a vertical planar side surface 11j on the side adjacent to the location of the cutting tool 5. The vertical side surface 11j does not, however, function as the fence surface along which a workpiece is pushed into engagement with the cutting tool. Side surface 11j is provided with two vertically spaced, longitudinal ribs 11k for a purpose to be later described.

Figure 1:
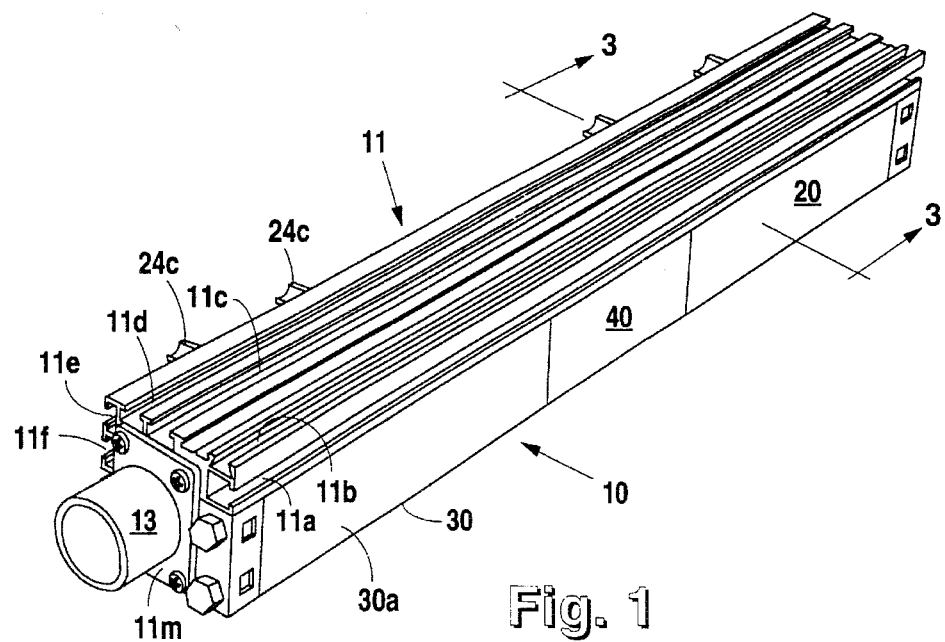
FIG. 1 is a perspective view of an assembled fence for a woodworking tool embodying this invention.
Figure 4A:
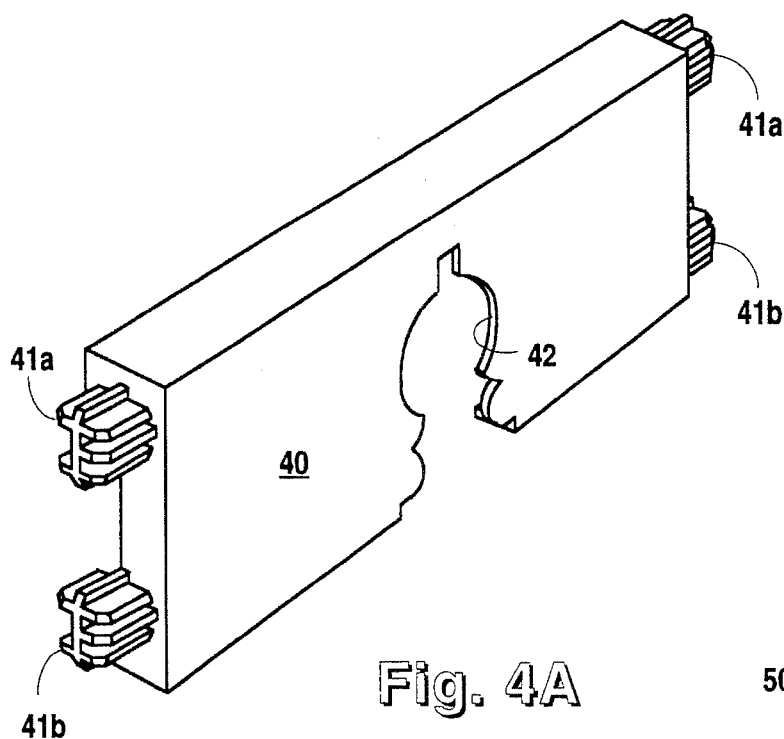
FIG. 4A is an enlarge scale perspective view of the fence insert.
Figure 6:
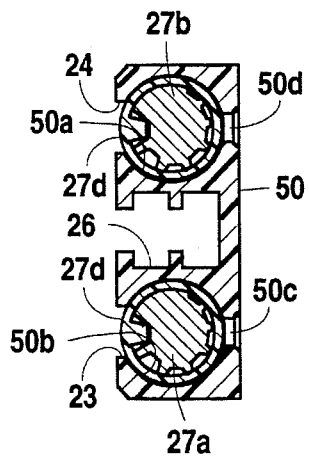
FIG. 6 is a sectional view taken on the plane 6—6 of FIG. 5.
Figure 4B:
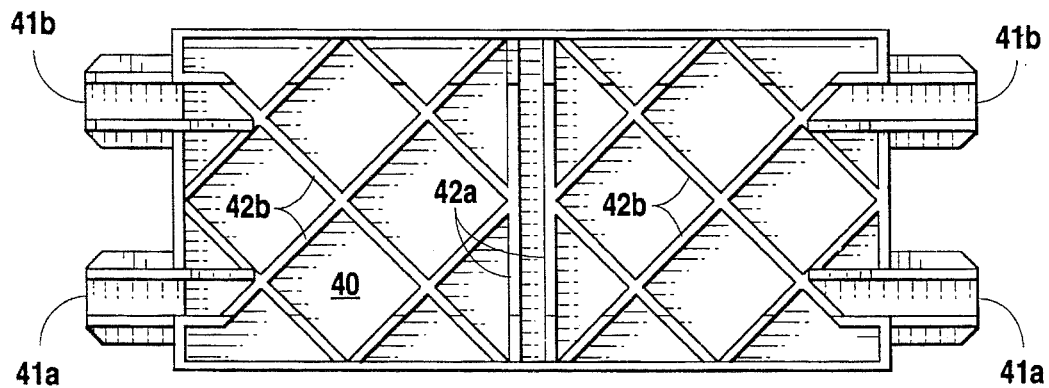
FIG. 4B is a rear elevational view of FIG. 4A.
Figure 5:
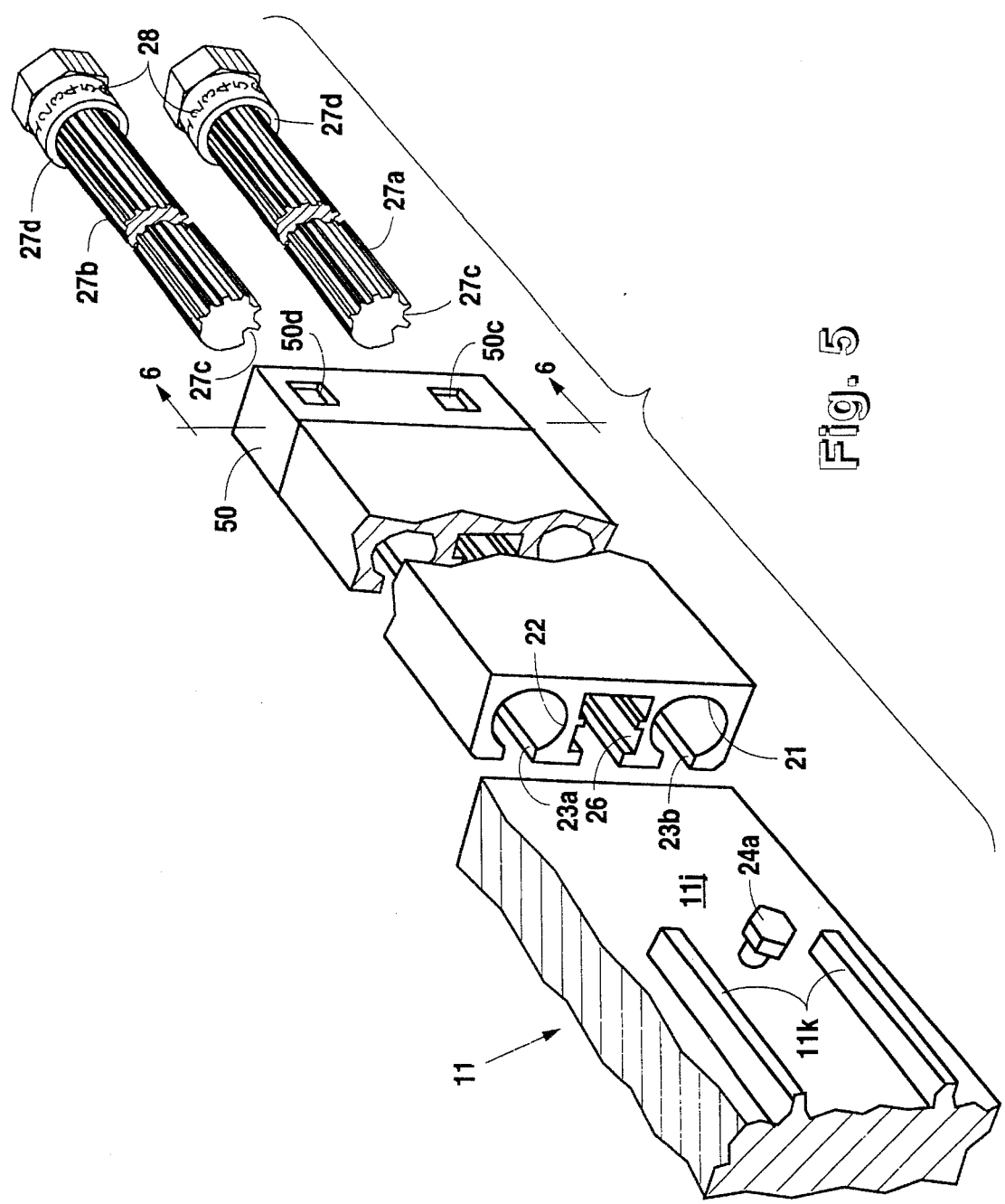
FIG. 5 is an exploded perspective view illustrating the adjusting rod for a fence element.

The actual guide surfaces of the fence are provided through the assembly of three separate fence elements to the vertical planar surface 11j in the manner best illustrated in FIGS. 1, 3A and 5. The three elements forming the fence are respectively a forward fence element 20, an identical rearward fence element 30, and an insert element 40. Insert element 40 is inserted between the forward and rearward fence elements 20 and 30 by having a two vertically spaced projections 41a and 41b (FIG. 4B) on each end of the insert fence element 40 which are snugly fittable into the adjacent ends of two longitudinally extending vertically spaced bores 21 and 22 formed in the forward fence element 20 and the adjacent open ends of similar bores (not shown) formed in the rear fence element 30. Because of the complexity of their structures and the required accuracy of their elements, the identical front and rear fence elements 20 and 30 are preferably fabricated by machining a steel block. Insert element 40 may be formed by injection molding of a suitable rigid plastic material, such as a glass filled resin sold under the trademark Valox by General Electric Company.

Referring specifically to FIG. 5, and as mentioned above, the vertical planar face 11j of the tubular body 11 is provided with a pair of vertically spaced horizontally extending ribs 11k. These ribs are slideably engaged in slots 23a and 23b formed along the surface of fence element 20 and communicating with two vertically spaced longitudinal bores 21 and 22 of the forward fence element 20. Similar slots (not shown) are provided in the identical rear fence element 30.

The front and rear fence elements 20 and 30 are respectively secured in snug engagement relative to the vertical planar face 11j of the tubular body element 11 by a plurality of bolts 24 having enlarged head portions 24a which traverse the tubular body element 11 in the manner shown in FIG. 3A. The enlarged head portions 24a of the bolts 24 engage in an elongated T-slot 26 which traverses the entire length of the forward fence element 20. A similar T-slot is provided in the identical rear fence element 30, but is not shown in the drawings. A nut 24b is secured to the threaded ends of the each of the bolts of 24 and an enlarged knob 24c is secured to each nut 24b to permit convenient manual tightening of the bolts 24, thus clamping the front fence portion 20, or the rear fence portion 30, as the case may be, into snug engagement relative to the vertical planar surface 11j of the tubular body 11.

Figure 3B:
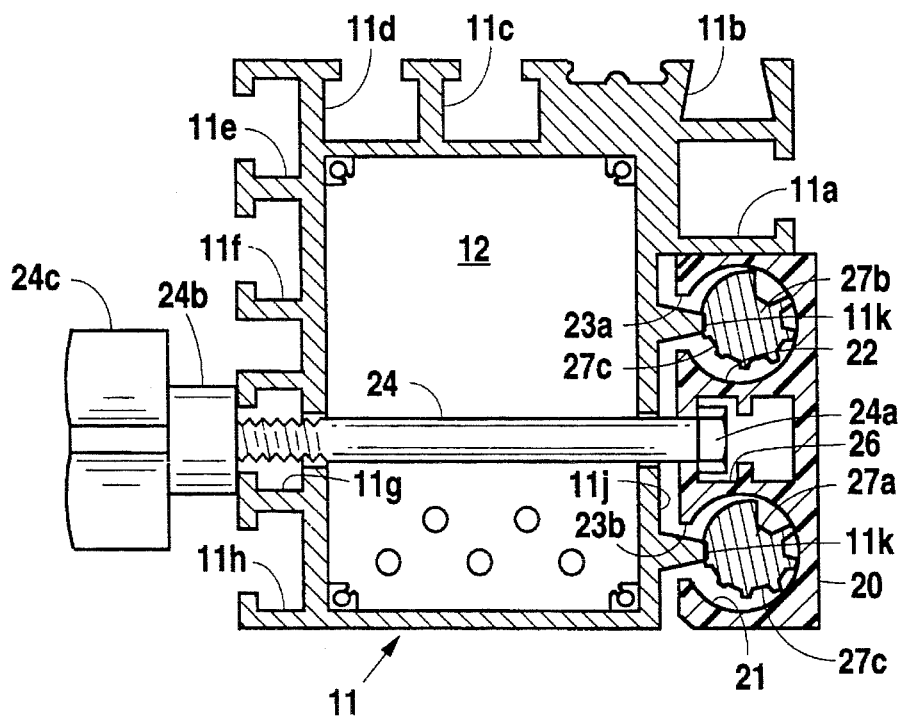
FIG. 3B is a view similar to FIG. 3A, but showing the fence element in its opposite extreme lateral position.

In accordance with this invention, the horizontal or lateral positions of both the front and rear fence portions 20 and 30 relative to the tubular body 11 may be conveniently adjusted by a pair of identical rods 27a and 27b which are respectively mounted in vertically spaced longitudinal bores 20a and 20b formed in the forward fence portion 20. Similar rods (not shown) are provided in the identical rear fence portion 30. Each of the rods is provided with a plurality of peripherally spaced, longitudinally grooves 27c which gradually increase peripherally in amount of radial depth relative to the center of the respective rod. By loosening the nuts 24b on the end of the bolts 24, the rods 27a and 27b may be rotated to engage the longitudinally extending ribs 11k in a selected groove 27c on rods 27a and 27b. Thus, as best shown in FIG. 3B, the rotation of the rods 27a and 27b to identical selected angular positions will effect a horizontal lateral displacement of the front fence element 20 or the rear fence element 30 in increments as low as 0.016 inches.

In this manner, the work engaging vertical surface 30a of the rear fence portion 30 can be moved transversely outwardly so as to engage the new planar surface formed on the workpiece by the action of the cutting tool 2. In this manner, the workpiece is firmly supported by both the front and rear fence portions, irrespective of the fact that a small surface portion may have been removed from the workpiece engaging surface by the action of the cutting tool 2.

To facilitate the setting of the adjusting rods 27 and 28, each rod 27a and 27b is provided with a cylindrical surface 27d (FIG. 5) upon which are overlaid or engraved numbers 28 indicating angular positions of the rods. The cylindrical surfaces 27d also respectively cooperate with internal cylindrical surfaces 50a and 50b formed in an end cap 50 which is of the same rectangular configuration as the forward or rear fence portion and is snugly secured thereto by an adhesive or by press fitted pins (not shown). Two openings 50c and 50d are respectively provided in the end cap 50 to overlay the path of rotation of the numerals 28 provided on the cylindrical portions 27d of the rods 27a and 27b. Thus it may be assured that both rods are in the same angular position relative to the ribs 11f on the fence support 11 and hence that the vertical alignment of the forward fence portion 20 (or the identical rear fence portion 30) may be maintained.

As originally assembled in the fence, as shown in FIGS. 1 and 2, the insert fence portion 40 merely constitutes a connection between the rearward end of the forward fence portion 20 and the forward end of the rearward fence portion 30, which is dimensionally identical to such front and rear fence portions. While the insert fence portion 40 may constitute a solid block of cuttable material, and may even comprise a wooden block, it is preferably formed by injection molding to provide maximum rigidity with minimum weight. This is accomplished through the provision of transverse and angular ribs 42a and 42b respectively provided on the internal surface of the block 40 as best shown in FIG. 4B.

The fence construction embodying this invention may be utilized as an ordinary workpiece guide by the assemblage of the insert 40 between the forward fence element 20 and the rearward fence element 30 as shown in FIGS. 1 and 2. This is not, however, the primary purpose of the construction embodying the invention.

The fundamental purpose of the invention is to utilize the cuttable insert 40 as a means for permitting the rapid alignment of the fence 10 relative to each cutting tool that is normally utilized by the operator. As illustrated in FIG. 2, the fence 10 is first aligned by the positioning mechanism 5 so that the center of the insert 40 is in alignment with the vertical axis of the cutting tool 2. The fence 10 is then moved toward the cutting tool 2 and the insert 40, being fabricated of a cuttable material, is cut away, leaving a contour 42 in the insert 40, as illustrated in FIG. 4A. A similar operation is performed for each cutting tool to be used by the operator so that the operator ends up with a plurality of inserts 40, each of which has a contour 42 that precisely corresponds to the configuration of the particular cutting tool. Such insert 40 is then assembled on the fence 10 and the fence 10 can be rapidly moved to a secured position relative to the table 1 with the contour 42 snugly engaging the exterior of the cutting tool 2. Thus, precise alignment of the fence relative to each cutting tool may be rapidly and accurately obtained.

During the actual cutting operation on a workpiece, the contour 42 performs an additional important function in that it substantially eliminates the possibility of dust and chips formed by the cutting operation being thrown into the atmosphere. The application of a vacuum to the internal chamber 12 of the fence support 11 through the vacuum connection 13 ensures that substantially all dust and chips will be drawn into the vacuum proceeding device. Lastly, the operator safety is greatly enhanced since there is no large opening in the fence adjacent to the cutting tool into which the end of the workpiece or the operator's finger may be inadvertently brought into engagement with the cutting tool in the process of aligning and moving the workpiece relative to the fence 10.

Modifications of the aforedescribed structure will be readily apparent to those skilled in the art and it is intended that all such readily apparent modifications be defined within the scope of the appended claims.

I claim:

1. Apparatus for accurately positioning a workpiece guide fence relative to a cutter rotatable about a vertical axis and having a cutting portion projecting vertically above a horizontal table surface, comprising, in combination;

an elongated fence detachably mountable on said table surface to guide a workpiece into engagement with the periphery of said cutter;

said fence having an opening positionable on the table surface to enclose a diametrical vertical half of said cutting portion, said opening being substantially larger in height and length than the height and diameter of said cutting portion;

a gauging plate snugly and detachably mounted in said opening;

said gauging plate having a cutter contoured opening formed by moving said fence laterally at least to a position of alignment with the central vertical plane of said cutting portion while said cutter is rotated, thereby forming a cutter contoured opening in said gauging plate;

whereby each time that said cutter is subsequently utilized to cut a workpiece, said precut cutter contoured opening in said gauging plate may be moved laterally by said fence to snugly surround said cutting portion of said cutter to achieve lateral alignment of said fence relative to said cutting tool.

2. The apparatus of claim 1 wherein said fence comprises an elongated tube, the interior of said tube communicating with said contoured opening in said barrier plate; and means on said fence for connecting the interior thereof with a vacuum source, thereby reducing cutting dust discharged into the surrounding atmosphere.

3. The apparatus of claim 2 further comprising means for sealing the ends of said hollow tube; and a hose connection for said vacuum source mounted on one said end sealing means.

4. A fence for a woodworking machine having a horizontal table surface and a power driven cutting tool projecting upwardly through said table surface and rotating about a vertical axis, comprising, in combination;

an elongated tubular fence support;

said support having a planar bottom face adapted to abuttingly engage said table surface, and a planar vertical face;

means for securing said fence support to said table surface with said planar vertical face parallel to the desired path of movement of a workpiece relative to the cutting tool and laterally spaced from the cutting tool;

said vertical and horizontal faces of said fence support respectively having openings in their medial portion having a greater length than the largest diameter portion of the cutting tool exposed above said table surface, and a height greater than the exposed height of said cutting tool;

said opening dividing said vertical face of said fence support into a workpiece entry portion and a workpiece discharge portion;

a first fence element having a vertical planar workpiece guide surface;

means for laterally adjustably securing said first fence element to said workpiece entry portion of said vertical face of said fence support, whereby said vertical planar surface of said first fence element defines a vertical workpiece guiding surface alignable with respect to the vertical axis of the cutting tool;

a second fence element having a vertical planar workpiece guide surface;

means for laterally adjustably securing said second fence element to said workpiece discharge-portion of said fence support, whereby said vertical planar surface of said second fence element defines a vertical workpiece guiding surface alignable with respect to the vertical axis of the cutting tool;

means for longitudinally adjusting the secured position of said first and second fence elements relative to said fence support;

said first and second fence elements respectively having a trailing end surface and a leading end surface disposed in spaced opposed relationship on longitudinally opposite sides of the cutting tool, thereby defining a second opening substantially greater than the diameter of the cutting tool; and a barrier element snugly mounted in said second opening; said barrier element having a third opening corresponding to the shape of a vertical plane cross-section of the exposed portion of the cutting tool.

5. The apparatus of claim 4 further comprising means for closing the ends of said elongated tubular support;

hose coupling means on said tubular support for connection to a vacuum source for removal of dust and chips produced by the cutting operation 6. The apparatus of claim 5 wherein said hose coupling means are mounted on one of said end closing means.

7. The apparatus of claim 4 wherein said means for laterally adjusting the transverse position of said first fence element comprises a plurality of rods, each rod having a short length cylindrical surface for longitudinally and rotatably mounting the respective rod in said first fence portion;

each of said rods also having a plurality of longitudinal grooves longitudinally spaced around the outer periphery of each said rod;

a plurality of longitudinal ribs on said vertical planar surface of said fence support respectively engaging selected ones of said rod grooves in any selected angular position of said rods;

said grooves being of increasing depth around said outer periphery of said rods; and means for manually rotating said rods to concurrently bring similar grooves of said rods into engagement with said longitudinal ribs to incrementally adjust the spacing of said first fence element relative to the vertical axis of the cutting tool.

8. The apparatus of claim 7 wherein the ends of said plurality of rods project beyond the forward end of said first fence element; and visible indicia extending around the projecting ends of said rods to indicate the angular position of each said rod to permit convenient alignment of said ribs with said grooves at the same angular position of said rods.

9. The apparatus defined in claim 8 further comprising an end cap secured to the rearward end of said first fence element;

said end cap defining a plurality of cylindrical bores for respectively rotatably mounting said rods.

10. The apparatus defined in claim 9 wherein each said end cap has apertures respectively overlying the rotational path of said indicia, whereby said indicia on each said rod may be readily observed.

11. The apparatus defined in claim 4 wherein said means for longitudinally adjustably securing each said fence element to said workpiece entry portion of said fence support comprises;

a plurality of guide bolts traversing said fence support and longitudinally spaced along said fence support;

said bolts having their head portions lying adjacent said planar vertical face of said fence support;

each said fence element having a longitudinally extending T-shaped slot formed in its surface abutting said fence support to slideably receive said bolt heads; and a plurality of nuts respectively engaging the ends of said bolts projecting through said tubular fence support, whereby tightening said nuts rigidly secures said fence element to said tubular fence support.

12. The apparatus of claim 4 wherein said means for adjusting the transverse position of said second fence element comprises a plurality of rods, each rod having a short length cylindrical surface for longitudinally and rotatably mounting the respective rod in said second fence portion;

each of said rods also having a plurality of longitudinal grooves spaced around the outer periphery of each said rod;

a plurality of longitudinal ribs on said vertical planar surface of said fence support respectively engaging selected ones of said grooves in any selected angular position of said rods;

said grooves being of increasing depth around said outer periphery of said rods; and means for manually rotating said rods to concurrently bring similar depth grooves in said rods into engagement with said longitudinal ribs of said fence support to incrementally adjust the lateral spacing of said second fence element relative to the vertical axis of the cutting tool.

13. The apparatus of claim 12 wherein the ends of said plurality of rods project beyond the rearward end of said second fence element; and visible indicia extending around the projecting ends of said rods to indicate the angular position of each said rod to permit convenient alignment of said rods with said longitudinally ribs at the same angular position relative to said second fence element.

14. The apparatus defined in claim 13 further comprising an end cap secured to the rearward end of said second fence element;

said end cap defining a plurality of cylindrical bores for respectively rotatably mounting said rods.

15. The apparatus defined in claim 14 wherein each said end cap has apertures respectively overlying the rotational path of said indicia, whereby said indicia on each said rod may be readily observed.

* * * * *